United States Patent
Lange et al.

(10) Patent No.: US 10,275,197 B2
(45) Date of Patent: Apr. 30, 2019

(54) METHOD AND FLAT BED PRINTER FOR PRINTING PRINT JOBS ON MEDIA PIECES ON THE FLAT BED OF THE FLAT BED PRINTER

(71) Applicant: Océ-Technologies B.V., Venlo (NL)

(72) Inventors: Martinus G. M. Lange, Venlo (NL); Dominique M. L. Perdaen, Venlo (NL); Anne A. Wind, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/653,008

(22) Filed: Jul. 18, 2017

(65) Prior Publication Data

US 2017/0315765 A1 Nov. 2, 2017

Related U.S. Application Data

(63) Continuation of application No. PCT/EP2016/051133, filed on Jan. 20, 2016.

(30) Foreign Application Priority Data

Jan. 28, 2015 (EP) .................................. 15152798

(51) Int. Cl.
   *G06F 3/12* (2006.01)
   *B41J 29/393* (2006.01)
   *G06K 15/10* (2006.01)

(52) U.S. Cl.
   CPC .......... *G06F 3/1262* (2013.01); *B41J 29/393* (2013.01); *G06F 3/1204* (2013.01);
   (Continued)

(58) Field of Classification Search
   None
   See application file for complete search history.

(56) References Cited

U.S. PATENT DOCUMENTS

2013/0141763 A1* 6/2013 Giannetti .............. G06F 3/1219
                                                  358/1.18
2016/0210087 A1* 7/2016 Amir ..................... G06F 3/1217

FOREIGN PATENT DOCUMENTS

| GB | 2465757 A | * | 6/2010 | .......... B41J 11/0085 |
| GB | 2465757 A | | 6/2010 | |
| WO | WO 2011/155948 A1 | | 12/2011 | |

OTHER PUBLICATIONS

International Search Report (PCT/ISA/210) issued in PCT/EP2016/051133, dated Mar. 24, 2016.
(Continued)

*Primary Examiner* — Huo Long Chen
(74) *Attorney, Agent, or Firm* — Birch, Stewart, Kolasch & Birch, LLP

(57) ABSTRACT

A method for printing a plurality of print jobs on a flat bed printer includes automatically grouping the print jobs into a plurality of consecutive container jobs, and for each container job automatically creating a digital plan of the flat bed, automatically defining a mask with cutting information according to the created plan, receiving the defined mask on the flat bed, receiving the media pieces on the flat bed positioned in according with the received mask, and unattended printing of the print jobs on the media pieces by the flat bed printer making use of the received mask. The automatic grouping includes gathering the group of print jobs due to the print job characteristics of each of the print jobs and/or the flat bed characteristics of the flat bed and ordering the consecutive container jobs due to the print job characteristics of each of the print jobs and/or the flat bed characteristics of the flat bed.

15 Claims, 5 Drawing Sheets

(52) U.S. Cl.
CPC .......... *G06F 3/1208* (2013.01); *G06F 3/1254* (2013.01); *G06F 3/1257* (2013.01); *G06K 15/107* (2013.01)

(56) References Cited

OTHER PUBLICATIONS

Written Opinion (PCT/ISA/237) issued in PCT/EP2016/051133, dated Mar. 24, 2016.

\* cited by examiner

METHOD AND FLAT BED PRINTER FOR PRINTING PRINT JOBS ON MEDIA PIECES ON THE FLAT BED OF THE FLAT BED PRINTER

CROSS-REFERENCE TO RELATED APPLICATIONS

This application is a Continuation of PCT International Application No. PCT/EP2015/051133, filed on Jan. 20, 2016. PCT/EP2015/051133 claims priority under 35 U.S.C. § 119 to application Ser. No. 15/152,798.3, filed in Europe on Jan. 28, 2015. The entirety of each of the above-identified applications is expressly incorporated herein by reference.

BACKGROUND OF THE INVENTION

1. Field of the Invention

The invention relates to a method for printing a plurality of print jobs on a flat bed printer having a flat bed with flat bed characteristics, each of the plurality of print jobs having print job characteristics. The flat bed printer comprises a controller configured to control the printing of digital images on the plurality of pieces of media, an armature constructed to move over the flatbed surface in at least one direction, and at least one print head configured to eject recording material on the plurality of pieces of media, the at least one print head being attached to the armature.

The invention also relates to a flatbed printer configured to execute the method of the invention.

The invention further relates to a computer program product, including computer readable code embodied on a non-transitory computer readable medium, said computer readable code comprising instructions for printing on a plurality of pieces of media according to print jobs by means of a flat bed printer according to the method of the invention.

The print head of the flatbed printer may be mounted on an armature above the flat bed. The armature may be a robot arm to which the print head is attached. The robot arm may move in a plurality of directions over the flat bed. The armature may be a gantry moving over the flat bed in a first direction, while the print head is movable along the gantry in a second direction perpendicular to the first direction. In case of a print head having a same width as the flat bed, the armature may be moving in one direction over the flat bed, i.e. the first direction. The controller is connected to the print head for controlling the print head. The controller controls the movement of the print head over the flat bed and the ejection of recording material towards the flat bed. The controller is connected to the print head for controlling the print head height with respect to the flat bed. The distance from the print head to the flat bed may be variable in order to allow the printing of pieces of media of different thicknesses. A change in a distance from the print head to the flat bed will take a substantial amount of time.

The recording material may be ink, e.g. a UV curable ink. When a UV curable ink is used, the print head is also provided with UV lamps for curing the recording material when ejected on the piece of media placed on the flat bed. The flat bed usually has the form of a rectangle, for example of a width of 1.22 m and a length of 1.22 m, or of a width of 1.22 m and a length of 2.44 m.

A piece of media with dimensions smaller or equal to the dimensions of the flat bed can be placed on the flat bed. Even a piece of media with dimensions larger than the dimensions of the flat bed can be placed on the flat bed and has to be moved to get it completely printed.

Flat bed print systems usually apply recording material, like colorants, on a piece of media placed on the flat bed in the form of ink according to a digitally defined, two-dimensional pattern of pixels with values that indicate a composition of these colorants. This pattern is generated out of a digital image, that may comprise objects in either vectorized or rasterized format, using conventional techniques like interpretation, rendering, and screening by a raster image processor. The processing of a digital image includes color management to convert color values of the pixels in the digital image into composition values related to the printer color space as is set up by the colorants of the print system. Depending on the intended print quality, a print mode may be selected to influence the characteristics of the print process. According to the selected print mode, the pixels of the pattern may be printed in a corresponding resolution and in more than one pass, wherein a position of the piece of media on the flat bed has an opportunity to receive a colorant in one or more of the passes of the print head across the flat bed. An image to be printed may be delivered to the flat bed printer comprised in a print job, which may be submitted by a user or an operator from a work station coupled to the flat bed printer via a digital network connection.

Print jobs may also contain images which have to be printed in multiple layers. For example a first white layer is deposited as a background, a second color layer is deposited as a color image to be established and a third varnish layer is deposited in order to protect the second layer.

2. Background of the Invention

An operator may place pieces of media on the flatbed surface in order to print images from a plurality of print jobs on the pieces according to digital images which have been offered to the controller by means of submitted print jobs. Positioning of a piece of media must be done very accurately with respect to its position and orientation. The operator usually measures right-angled distances of the piece of media from the edges of the flat bed by a measuring tool like a measuring cord, a tape-measure or a ruler. Another method to position the media is to align the piece of media with reference rules which have been printed on the flat bed beforehand. The operator enters the measured distances by means of an application running on a computer connected to the controller of the flat bed or on the controller itself. After entering the distances, the operator selects the digital image to be printed on the piece of media and starts the printing of the flat bed printer. Therefore, the controller or the computer is provided with a user interface suitable for data entry in general. Resuming, the operator has to execute different manual time consuming steps. Each step may lead to operator errors before printing the digital image on the piece of media. Each of the print jobs may have print job characteristics like media height, print mode, UV curing indications, etc. The operator has to take the print job characteristics of the plurality of print jobs into account. To make it even more complex, the operator also has to take the flat bed characteristics, like geometry of the flat bed, suction holes of the flat bed and suction chambers underneath the flat bed, into account.

Nowadays, an operator places the media pieces on the flat bed and tapes off the edges of the pieces of media and the parts of the flat bed which are not covered by media pieces in order to avoid pollution of the flat bed by ink deposition and to avoid unnecessary air sucking via suction holes in the flat bed. A suction hole is a hole in the flat bed for sucking the media pieces to the flat bed surface to avoid displacement of the media piece over the flat bed surface. The taping action of the operator takes a substantial amount of time and makes the print process less productive.

SUMMARY OF THE INVENTION

It is an object of the invention to achieve a method for productive, error free and unattended printing of a plurality of print jobs by means of a flat bed printer.

According to the present invention, this object is achieved by a method comprising the steps of automatically grouping the plurality of print jobs into a plurality of consecutive container jobs, each container job comprising a group of print jobs for which media pieces are intended to be laid down on the flat bed for printing the group of print jobs on the media pieces in one print batch, and a digital plan of the flat bed, the digital plan comprising representations of the media pieces on which the group of print jobs in the container job are intended to be printed, and for each container job, automatically defining digital mask data with cutting information according to the digital plan for producing a mask sheet, receiving the produced mask sheet on the flat bed, and at least once executing the steps of receiving the media pieces on the flat bed positioned in accordance with the received mask sheet, and unattended printing of the plurality of print jobs of the container job on the media pieces by means of the flat bed printer making use of the received mask sheet, wherein the automatic grouping of the plurality of print jobs into the plurality of consecutive container jobs comprises the steps of gathering the group of print jobs for a container job due to the print job characteristics of each of the plurality of print jobs and/or the flat bed characteristics of the flat bed and ordering the consecutive container jobs due to the print job characteristics of each of the plurality of print jobs and/or the flat bed characteristics of the flat bed.

The digital plan of the flat bed may comprise representations with the same aspect ratios as the corresponding media pieces. The representations are positioned in the digital plan at the positions corresponding to the intended locations of the media pieces to be put on the flat bed. The digital plan is used for defining the digital mask data with cutting information for producing the mask sheet.

The mask sheet may be produced on a nearby cutting machine according to the created plan or otherwise, for example manually by cutting out a print of the created plan by means of scissors. Holes in the mask sheet may be created in order to be covered by the media pieces on which images of the print jobs of the corresponding container job will be printed. In this way, the holes in the mask free suction holes of the flat bed for sucking to the media pieces laid down on the hole in the mask sheet. The operator or a robot may place the mask sheet on the flat bed.

The operator at least once lays down the media pieces corresponding to the print jobs in the current container job of the consecutive container jobs on the flat bed in accordance with the mask sheet. Since the grouping of the print jobs in a container takes the print job characteristics and the flat bed characteristics into account, the printing of the container job may take place unattended.

According to an embodiment of the method, the step of automatic grouping of the plurality of print jobs into the plurality of consecutive container jobs is executed by a funnel application having a plurality of co-operating modules comprising a first module comprising a first set of rules for grouping the print jobs into the container jobs, the first set of rules being based on the values of the print job characteristics of the print jobs, a second module comprising a second set of rules for determining a print order of the container jobs by the flat bed printer, and a third module comprising a third set of rules for grouping the print jobs into container jobs, the third set of rules based on the values of the flat bed characteristics.

According to an embodiment of the method, the step of automatic grouping of the plurality of print jobs into the plurality of consecutive container jobs comprises a step of minimizing the number of different container jobs. Minimizing the number of different container jobs results in less mask sheet to be used and results in a repeated use of the produced mask. The number of different container jobs may be achieved by combining parts of different print jobs. For example, if a first print job has to be printed 15 times and a second print job has to be printed 9 times, a container job may be created by grouping 5 times the images of the first print job and 3 times the images of the second print job. This created container job can be printed three times. Therefore, a mask created for the container job can be used three times.

According to an embodiment of the method, the print job characteristics comprise at least one out of a media to be used in the print job, which media has a thickness property, a print mode at which the print job is to be printed, a layer characteristic of the print job and a curing mode at which the result of the print job is cured.

According to an embodiment of the method, the flat bed characteristics comprise at least one of a geometry of the flat bed, a location table of suction holes in a surface of the flat bed, and a location table of at least one suction chamber underneath the surface of the flat bed surface, each of the at least one suction chamber being connected to at least one suction hole.

According to an embodiment of the method, the step of defining the digital mask data comprises the step of determining outlines near the borders of the media pieces on a digital template for the mask sheet, which are intended to be cut out in order to create holes in the mask sheet.

According to a further embodiment of the method, the step of defining the digital mask data comprises the step of determining smaller holes within the outlines near the borders of the media pieces on the digital template for the mask sheet in such a way that positions of the smaller holes in the mask sheet correspond to positions of at least one suction hole in the flat bed.

The invention also relates to flat bed printer comprising a flat bed for placing a plurality of pieces of media to be printed upon, the flat bed having flat bed characteristics, a controller for receiving print jobs to be printed on the plurality of pieces of media and controlling the printing of the received print jobs on the plurality of pieces of media, each of the print jobs having print job characteristics, an armature constructed to move over the flat bed in at least one direction, a print head configured to eject recording material on the plurality of pieces of media, the print head being attached to the armature, wherein the controller comprises a funnel configured to automatically group the plurality of print jobs into a plurality of consecutive container jobs, each container job comprising a group of print jobs for which media pieces are intended to be laid down on the flat bed for printing the group of print jobs on the media pieces in one print batch, and a digital plan of the flat bed, the digital plan comprising representations of the media pieces on which the group of print jobs in the container job are intended to be printed, and for each container job, automatically defining digital mask data with cutting information according to the digital plan for producing a mask sheet, and the flat bed is suitable for receiving the produced mask sheet and the media pieces on the flat bed positioned in accordance with the received mask sheet before the plurality of print jobs of the container job on the media pieces are unattended printed making use of the received mask sheet, and wherein the funnel comprises a plurality of co-operating modules comprising a first module comprising a first set of rules for grouping the print jobs into the container jobs, the first set of rules being based on the values of the print job characteristics of the print jobs, a second module comprising a second set of rules for determining a print order of the container jobs by the flat bed printer, and a third module comprising a third set of rules for grouping the print jobs into container jobs, the third set of rules based on the values of the flat bed characteristics.

The invention also relates to a non-transitory recording medium comprising computer executable program code configured to instruct a computer to perform the method according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMEMTS

Figure 1:
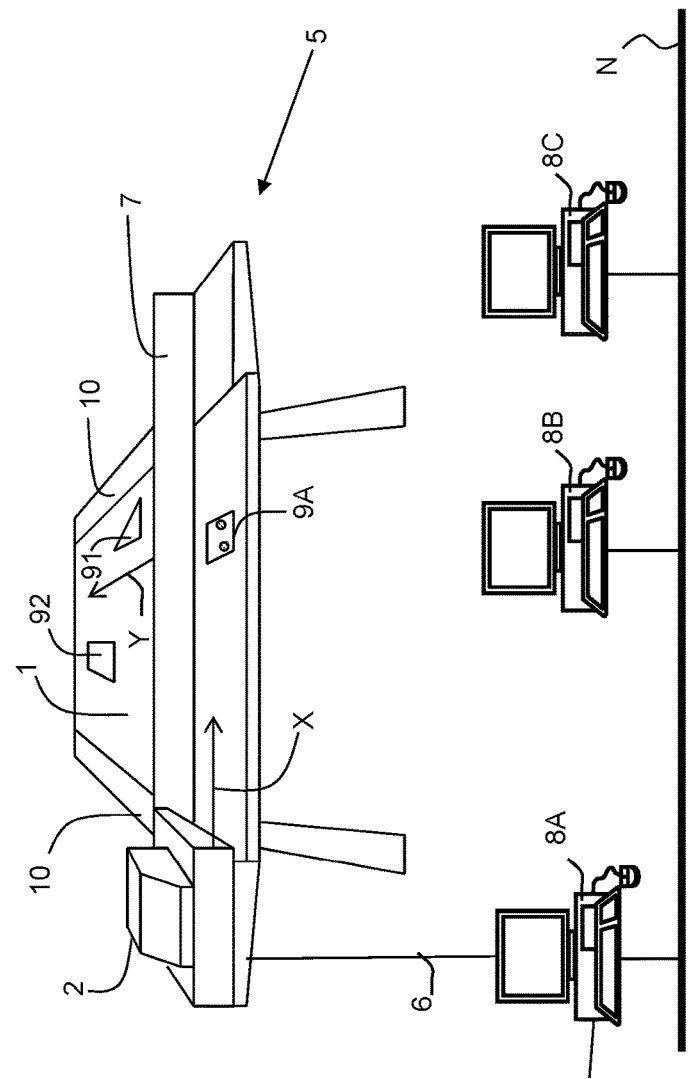
FIG. 1 shows a print system configured to apply the method of the invention.

The present invention will now be described with reference to the accompanying drawings, wherein the same or similar elements are identified with the same reference numeral.

FIG. 1 illustrates a print system 5 comprising a number of workstations 8B, 8C, which may be personal computers or other devices for preparing image data for prints to be printed. These workstations have access to a network N for transferring print jobs comprising the image data to a print controller 8A that is configured to receive the print jobs for prints and derive pass images. The print controller 8A may be part of the print system 5 connected to a controller of the print system 5 via a connection 6. The print system 5 further comprises a print head 2 attached to an armature 7 for applying colorants, for example cyan (C), magenta (M), yellow (Y), black (K) and white (W) colorant, or varnish to pieces 91, 92, 9A of flat print media placed on a flatbed surface 1 in order to obtain a printed image. The armature 7 may be a gantry above the flat bed surface 1 as shown in FIG. 1 or a robot arm (not shown) moving in a plurality of directions over the flat bed surface 1. The flatbed surface 1 is the surface of the flatbed, which is at least partially printable by the print head 2. The pieces of media may be so small that they are completely placed on the flatbed surface 1, but a piece of media which is larger than the flatbed surface, in which case an image which is going to cover the whole piece of media must be printed into a plurality of parts of the image, is not excluded. A first piece 9A has already been printed upon, while the other pieces 91, 92 are not provided with any recording material yet. The print head 2 reciprocally scans the flatbed surface 1 in the second direction X along the gantry 7 perpendicular to a first direction Y of the gantry 7 over the flatbed surface 1 along guiding parts 10. During printing of an image on the piece 9, 9A of media, the piece 91, 92, 9A of media is not moved on the flatbed surface 1. This way of working is advantageous for rigid print media. A print head which is as wide as the flatbed surface may also be envisaged within the scope of the invention. Such a print head may be moveable in at least one direction over the flatbed surface 1. The piece of media 9A may have a thickness of 10 mm, while the pieces of media 91, 92 may have a thickness of 20 mm.

Figure 2:
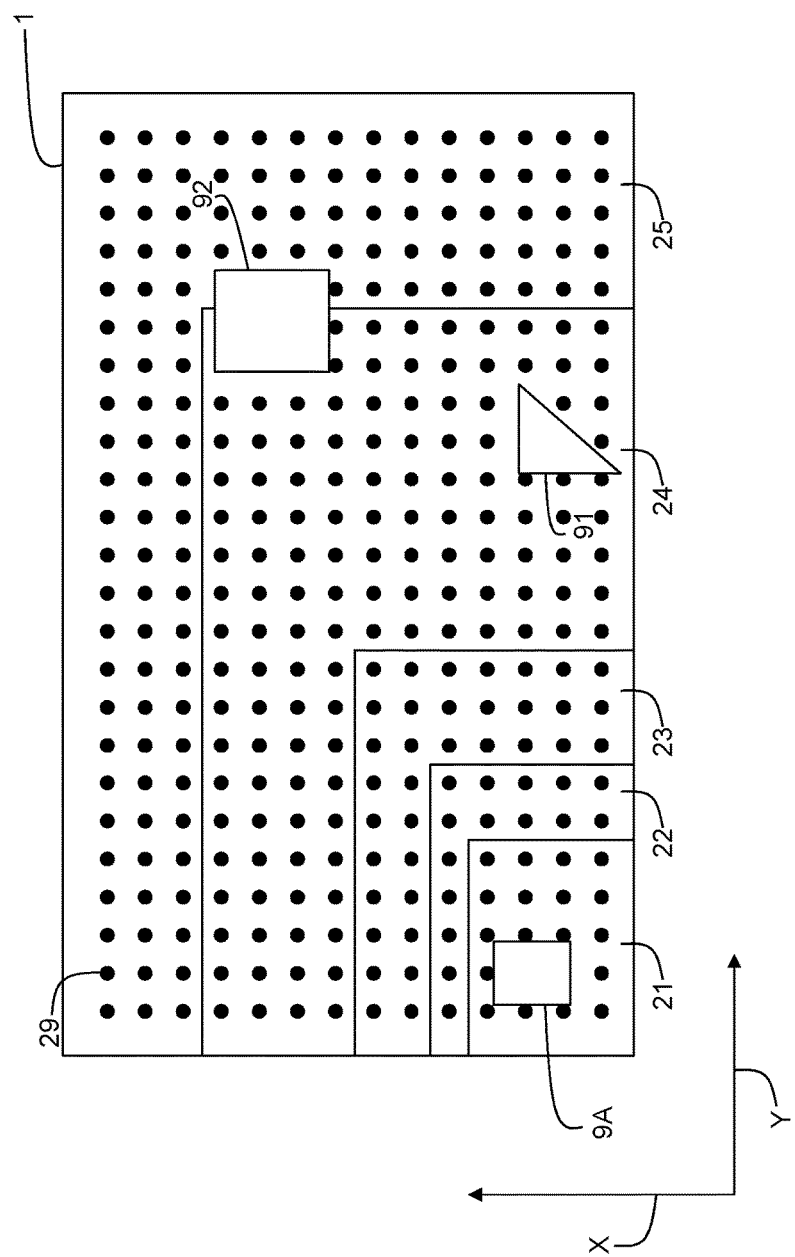
FIG. 2 is a top view of a flatbed surface of the printing system in FIG. 1.

FIG. 2 shows the flat bed 1 of FIG. 1 from a different viewpoint. The flat bed 1 is provided with a plurality of suction holes 29. A suction hole 29 is connected to at least one underlying suction chamber 21-25. The suction chambers 21-25 may be closed and opened separately in order to limit and/or expand the air flow to an air flow which is necessary and corresponding to the positions of the media pieces 91, 92, 9A on the flat bed 1. The number of suction holes, the number of suction chambers, the size of the suction holes, the size of the suction chambers, the geometry of the suction holes and the geometry of the suction chambers in FIG. 2 are exemplary. Other numbers, sizes or geometries may be envisioned.

Figure 3:
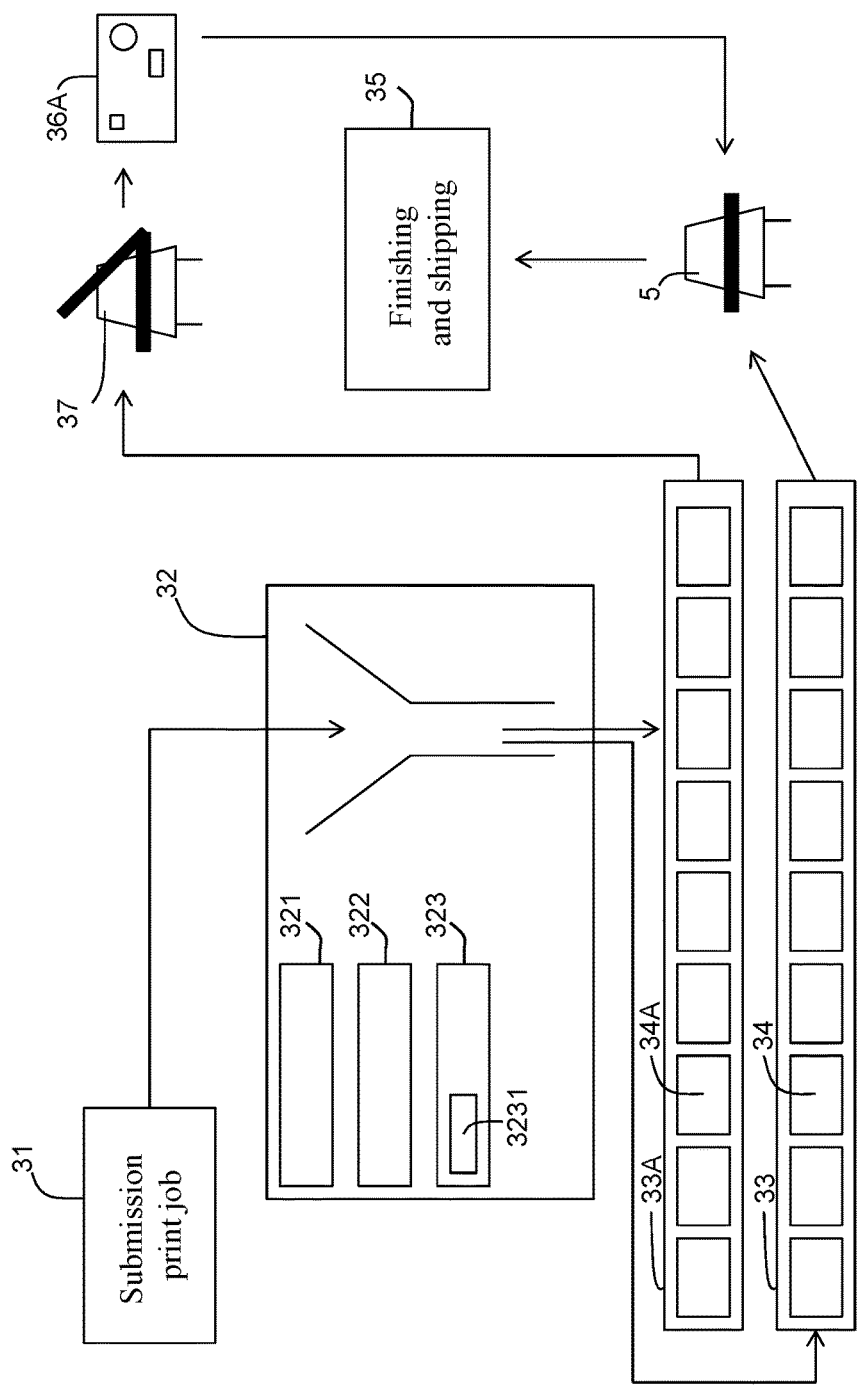
FIG. 3 is a schematic diagram of the method according to the invention.

FIG. 3 shows an embodiment of the method according to the invention. The flat bed printer 5 in FIG. 3 is the same as the flatbed printer 5 of FIG. 1. In a submission step 31 a print job is submitted to the controller 8A of the printing system 5 (See FIG. 1). The controller 8A comprises a funnel application 32 implemented in software and/or hardware. The funnel application is used to group submitted print jobs into container jobs 34 which are queued in a table queue 33. The container jobs in the table queue 33 are printed consecutively by means of the flat bed printer 5. After printing of a container job, the printed media pieces corresponding to the container job are finished and/or shipped in a finishing and shipping step 35.

The funnel application 32 comprises a first set 321 of rules to cluster the print jobs in a smart way. The rules are based on the values of print job characteristics of the submitted print jobs. Print job characteristics may be any kind of metadata comprised in the print job or in the submitted print job ticket, such as print job settings, print mode settings, media settings, image data, finishing specifications, delivery specifications, etc. Print jobs of a same media, print jobs of a same media height, print jobs having a same finishing step, print jobs having a same client, and print jobs having a same shipping deadline may be grouped into container jobs 34 according to the first set of rules of the funnel application 32.

The print order of the container jobs 34 by the flat bed printer 5 is determined by a second set 322 of rules of the funnel application 32. Rush jobs may also been taken care of by the second set of rules of the funnel application 32. In an embodiment of the method, the funnel application calculates the printing deadline of a container job based on the finishing steps and/or the shipping deadline. When the printing deadline of a container job is reached, the container job will become a priority job and is treated accordingly. The result of the funnel application 32 is an optimized productivity of the flat bed printer 5.

The funnel application 32 also takes into account a third set 323 of rules for grouping the print jobs into container jobs. The third set of rules is based on the flat bed characteristics. Some of the flat bed characteristics are already shown in FIG. 2, like the dimensions of the flat bed, the locations of the suction holes in the surface of the flat bed, the locations of the suction chambers connected to the suction holes underneath the flat bed surface, the vacuum settings of suction holes and/or suction chambers, and the UV lamp settings. The armature 7 may comprise a plurality of UV lamps which can be individually set for an illumination intensity per lamp. Print jobs having the same UV lamp settings may be grouped into a container job. In particular, a UV lamp setting is dependent on the media type of the print job. According to another embodiment, print jobs having a same UV lamp setting may be grouped in the plan for the container job. The plan may, for example, contain an upper half of print jobs having a first UV lamp setting and a lower half of print jobs having a second UV lamp setting, and the armature moves from the upper half to the lower half when printing the container job.

A subset 3231 of the third set of rules 323 is used to determine a digital plan for the print jobs of the container job to position the media pieces on the flat bed surface. For example, the media pieces for a container job must fit together on the flat bed. Such a fitting also depends on the sizes and the shapes of the images, and the sizes and the shapes of the media pieces, respectively. Another example concerns the coverage of the suction holes in the flat bed. In FIG. 2, the media piece 9A covers two suction holes. A rule of the third set 323 may determine that the media piece 9A needs to cover a maximum number of suction holes in order to achieve an optimal fixing of the media piece to the flat bed surface. This optimal fixing may be, for example, achieved by shifting the media piece 9A a half suction hole pitch to the right side in the Y direction. Such a shifting results in a coverage of four suction holes instead of two suction holes. Another rule of the third set 323 may determine that the media piece 92 needs to cover suction holes of at most one suction chamber. In FIG. 2, the media piece 92 partly covers two suction chambers 24, 25. By shifting the media piece 92 to the right side in the Y direction and/or to the top side in the X direction, the media piece 92 may cover suction holes of the suction chamber 25 only. This is advantageous, since only the suction chamber 25 has to be invoked for fixing the media piece 92.

The first set 321 of rules, the second set 322 of rules and the third set 323 of rules are organized in co-operating software and/or hardware modules in the controller of the flat bed printer 5. For cases where the results of application of first set 321 of rules, the second set 322 of rules and the third set 323 of rules conflict with each other, the funnel application comprises a predetermined priority scenario for all sets 321, 322, 323 of rules. The predetermined priority scenario may be implemented as a set of system settings of the flat bed printer and may be adapted by a system operator.

The first set 321 of rules, the second set 322 of rules, and the third set 323 of rules may be fixed or at least once configurable by means of a user interface of the print system according to the invention.

According to an alternative embodiment, the first set 321 of rules, the second set 322 of rules and the third set 323 of rules are combined with the predetermined priority scenario in one general set of rules.

The container jobs 34 are ordered in a table queue 33. The table queue 33 is a queue of subsequent container jobs, wherein each container job can be printed on the flat bed surface in one print session. A print session comprises putting a mask sheet on the flat bed surface, putting the media pieces on the flat bed and moving the armature 7 (See FIG. 1) one or more times over the flat bed while ejecting ink on the media pieces put on the flat bed. The mask sheet is dedicated to the container job but may be saved for later use in case of a reprint of the container job.

The subset 3231 of rules of the funnel application is also used to define digital mask data 34A for producing a mask sheet 36A. The digital mask data 34A may comprise digital data objects in either vectorized or rasterized format representing cut paths for the media pieces to be printed upon according to the print jobs in the container job. The digital mask data 34A may comprise a digital image comprising the cut paths. The digital mask data 34A is used for producing the mask sheet 36A. The digital mask data 34A may be sent to a cutting device 37 provided with cutting equipment to enhance a high productivity. The digital mask data 34A to be used for producing the mask sheets for each container job in the table queue 33 may also be queued in a digital mask data queue 33A.

A mask sheet 36A produced from the digital mask data 34A has to be put on the flat bed before the corresponding media pieces are put on the flat bed and before the corresponding container job 34 is printed. The production of a mask sheet may be scheduled in the digital mask data queue 33A in such a way that the mask sheet is ready and placed on the flat bed when the corresponding container job is sent to the flat bed printer 5. For example, the creation of a mask sheet for a specific container job on the cutting device 37 may take place during the printing of another container job, which is scheduled in the table queue 33 before the specific container job.

The mask sheet 36A produced on the cutting device 37 is used for positioning the media pieces on the flat bed, for keeping the flat bed clean and for covering the suction holes which are not used. The media pieces may have custom shapes. In general the produced mask sheet 36A is suitable for all kinds of shapes of the media pieces. Once the funnel application has determined the print jobs gathered in the container job and the positioning of the corresponding media pieces on the flat bed surface, the digital mask data may be defined. The digital mask data 34A contains outlines of the media pieces for positioning the media pieces on the flat bed.

Figure 4:
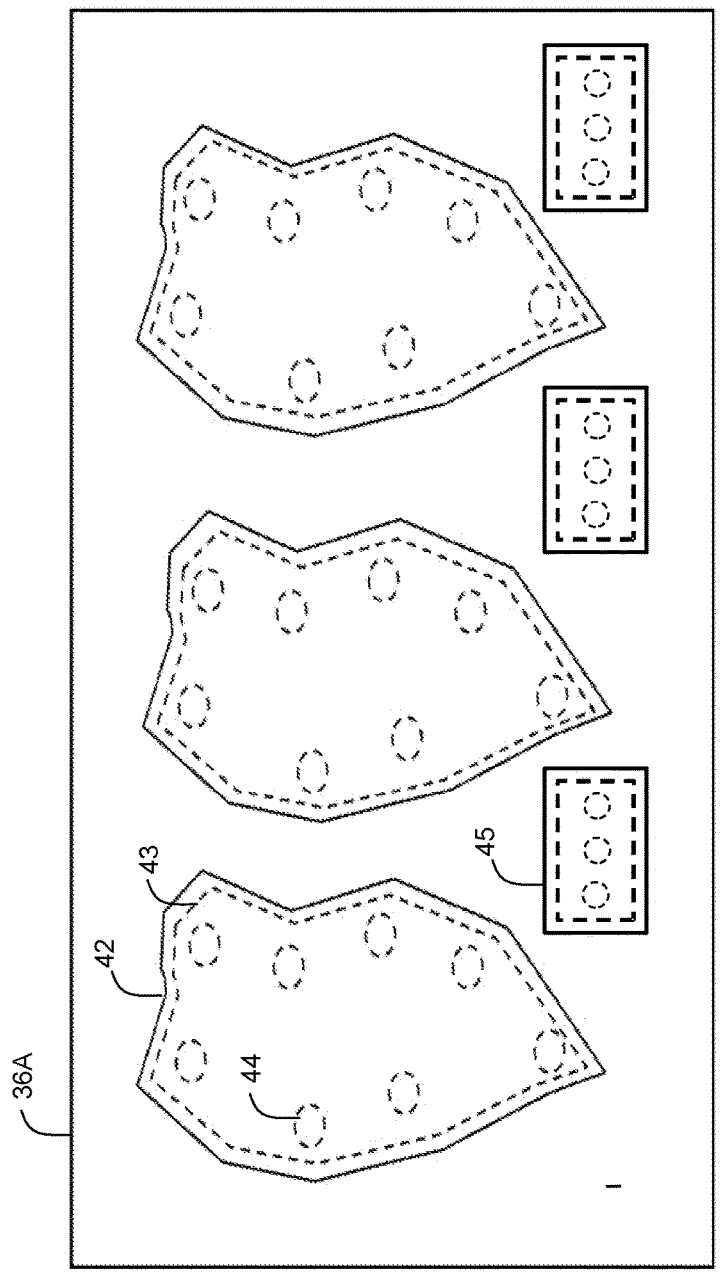
FIG. 4 shows a mask image according to the invention.

FIG. 4 shows a digital template for a mask sheet 36A. The outlines 42 of the media pieces on the digital template may be cut out in order to create holes in the mask sheet 36A. Dashed lines 43 within the outlines 42 indicate which part has to be cut out. Also, smaller holes 44 indicated within an outline 42 of a media piece in the mask sheet 36A may be envisioned to be cut out. The position of such a smaller hole 44 in the mask sheet 36A preferably corresponds to the position of at least one suction hole in the flat bed. Media pieces of different shapes result in different outlines 42, 45.

The outlines 42, 45 are fit together on the mask sheet 36A according to the plurality of sets of rules of the funnel application.

The cutting device 37 is configured to cut out holes according to the digital template and according to cutting device settings. The cutting device settings may be done automatically or manually by an operator. For example, a cutting device setting may be set to cut according to the outlines 42 of the media pieces in the template, according to the dashed lines 43 of the media pieces or according to the smaller holes 44 in the template. The cutting device 37 may also comprise a printer to print the template before cutting and a cutter to cut the holes in the printed template by means of visual detection of the outlines 42, dashed lines 43 and the lines 44 for the smaller holes on the printed template.

According to a first alternative embodiment, the outlines are printed on a breathable medium. This is advantageous, since the printed outlines do not need to be cut anymore.

According to a second alternative embodiment, the outlines are cut out manually.

According to a third alternative embodiment, the outlines are printed directly on the flat bed and the flat bed is configured to close every suction hole separately. The flat bed has to be cleaned each time a container job is printed.

Figure 5:
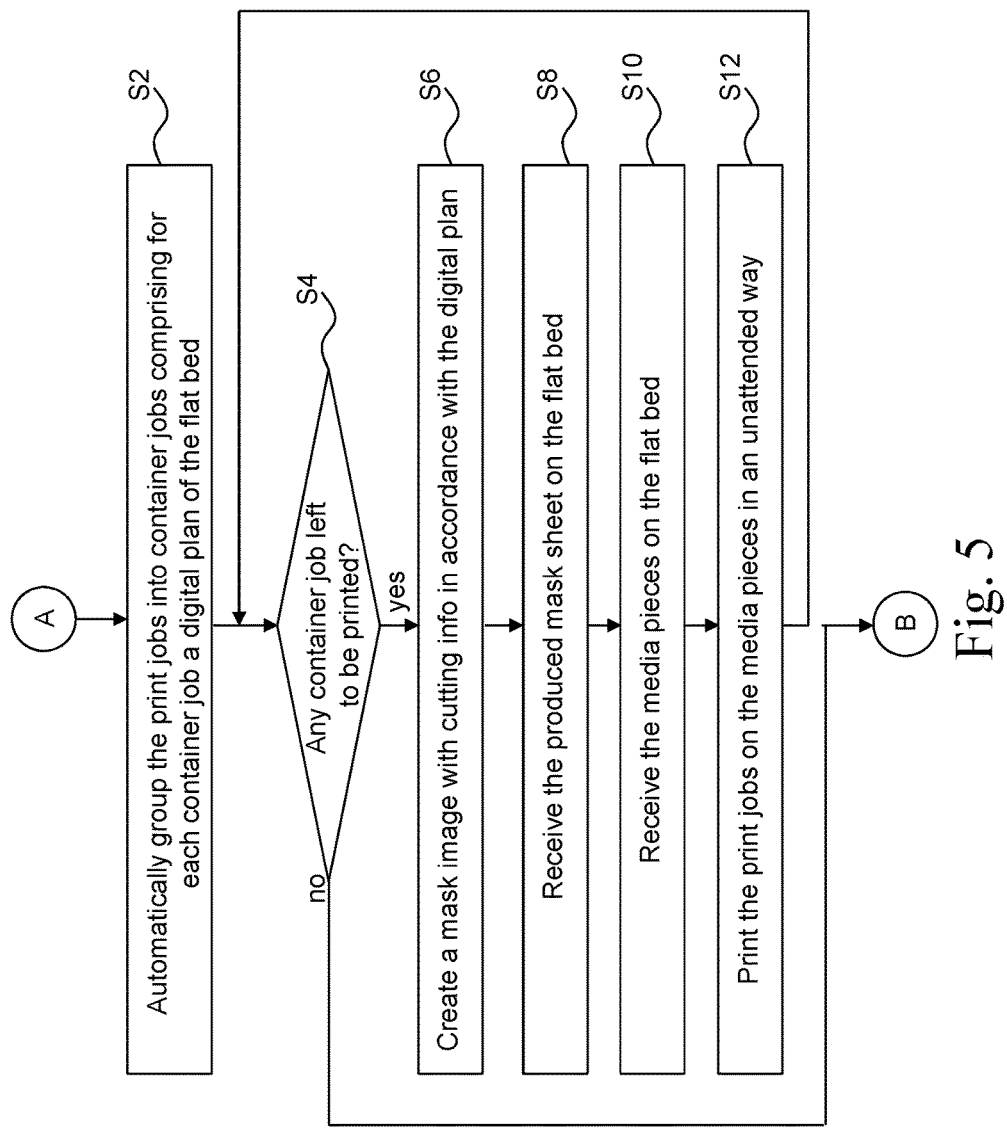
FIG. 5 is a schematic diagram of an embodiment of the method according to the invention.

FIG. 5 is a flow diagram of an embodiment of the method according to the invention. The starting point of the method is point A. Point A leads to a first step S2.

In the first step S2, the plurality of print jobs is automatically grouped into a plurality of consecutive container jobs. Each container job comprises a group of print jobs for which media pieces are intended to be laid down on the flat bed for printing the group of print jobs on the media pieces in one print batch. The automatic grouping of the plurality of print jobs into the plurality of consecutive container jobs comprises the steps of gathering the group of print jobs for a container job due to the print job characteristics of each of the plurality of print jobs and/or the flat bed characteristics of the flat bed and ordering the consecutive container jobs due to the print job characteristics of each of the plurality of print jobs and/or the flat bed characteristics of the flat bed. Each container job also comprises a digital plan of the flat bed. The digital plan comprises digital representations of the media pieces on which the group of print jobs in the container job are intended to be printed. The digital plan of the flat bed may comprise representations with the same aspect ratios as the corresponding media pieces. For each representation in the digital plan, a position is stored corresponding to the intended locations of the media pieces to be put on the flat bed. The digital plan is used for defining the digital mask data with cutting information for producing the mask sheet.

The automatic grouping may be implemented in the controller of the flat bed printer by means of a plurality of sets of rules as explained here-above.

In a second step S4, it is checked if there is a container job left which is not yet printed. If so, the method ends in end point B. If not, the method proceeds to a third step S6.

In a third step S6, digital mask data with cutting information is automatically created. The digital mask data mask image is derived from the digital plan created in the first step S2. The mask image will be used for producing a mask sheet. The mask sheet may be produced on another printer for achieving a productivity gain.

In a fourth step S8, the produced mask sheet is received on the flat bed. Markers may be positioned and/or indicated on the flat bed surface for aligning the mask sheet.

In a fifth step S10, the media pieces on the flat bed are received on the flat bed. The media pieces are positioned on the flat bed in accordance with the received mask sheet.

In a sixth step S12, the plurality of print jobs of the container job are unattended printed on the media pieces by means of the flat bed printer making use of the received mask sheet. After printing of the container job, the mask sheet and the media pieces are removed from the flat bed. The method returns to the second step S4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for printing a plurality of print jobs on a flat bed printer, the flat bed printer having a printer controller and a flat bed with flat bed characteristics stored in the printer controller, and each of the plurality of print jobs having print job characteristics, the method comprising the steps of:

automatically grouping the plurality of print jobs into a plurality of consecutive container jobs, each of the plurality of container jobs comprising:
a group of print jobs for which media pieces are intended to be laid down on the flat bed for printing the group of print jobs on the media pieces in one print batch; and
a digital plan of the flat bed, the digital plan comprising representations of the media pieces on which the group of print jobs in the container job are intended to be printed; and for each container job:
automatically defining digital mask data with cutting information according to the digital plan for producing a mask sheet;
receiving the produced mask sheet on the flat bed; and
at least once executing the steps of receiving the media pieces on the flat bed positioned in accordance with the received mask sheet, and unattended printing of the plurality of print jobs of the container job on the media pieces by means of the flat bed printer making use of the received mask sheet, wherein the automatic grouping of the plurality of print jobs into the plurality of consecutive container jobs comprises the steps of retrieving the flat bed characteristics from the printer controller and gathering the group of print jobs for a container job due to the print job characteristics of each of the plurality of print jobs and/or the retrieved flat bed characteristics of the flat bed and ordering the consecutive container jobs due to the print job characteristics of each of the plurality of print jobs and/or the retrieved flat bed characteristics of the flat bed, wherein the plurality of print jobs of the container job are unattended printed during a production of a mask sheet for a consecutive container job, and wherein the flat bed characteristics are stored in a funnel application comprised in the printer controller.

2. The method according to claim 1, wherein the automatic grouping of the plurality of print jobs into the plurality of consecutive container jobs is executed by a funnel application having a plurality of co-operating rules comprising:

a first set of rules for grouping the print jobs into the container jobs, the first set of rules being based on the values of the print job characteristics of the print jobs;

a second set of rules for determining a print order of the container jobs by the flat bed printer; and a third set of rules for grouping the print jobs into container jobs, the third set of rules based on the values of the flat bed characteristics.

3. The method according to claim 2, wherein the second set of rules includes calculating the printing deadline of a container job based on finishing steps and/or a shipping deadline of said container job, wherein when the printing deadline of a container job is reached, said container job will become a priority job and is treated accordingly.

4. The method according to claim 2, wherein the funnel application comprises a predetermined priority scenario for the first, second and third set of rules together for cases wherein the results of application of the first set of rules, the second set of rules and the third set of rules conflict with each other.

5. The method according to claim 4, wherein the predetermined priority scenario is implemented as a set of system settings of the flatbed printer.

6. The method according to claim 1, wherein the step of automatic grouping of the plurality of print jobs into the plurality of consecutive container jobs comprises a step of minimizing the number of different container jobs.

7. The method according to claim 1, wherein the print job characteristics comprise at least one out of:

a media to be used in the print job, the media having a thickness property;

a print mode at which the print job is to be printed;

a layer characteristic of the print job; and a curing mode at which the result of the print job is cured.

8. The method according to claim 7, wherein the flat bed characteristics comprise:

a geometry of the flat bed;

a location table of suction holes in a surface of the flat bed; and a location table of at least one suction chamber underneath the surface of the flat bed surface, each of the at least one suction chamber being connected to at least one suction hole.

9. The method according to claim 1, wherein the step of defining the digital mask data comprises the step of determining outlines near the borders of the media pieces on a digital template for the mask sheet which are intended to be cut out in order to create holes in the mask sheet, and the method comprises the step of creating the holes in the mask sheet according to the determined outlines near the borders of the media pieces.

10. The method according to claim 9, wherein the step of defining the digital mask data comprises the step of determining smaller holes within the outlines near the borders of the media pieces on the digital template for the mask sheet in such a way that positions of the smaller holes in the mask sheet correspond to positions of at least one suction hole in the flat bed.

11. A non-transitory recording medium comprising computer executable program code configured to instruct a computer to perform the method according to claim 1.

12. The method according to claim 1, wherein the step of ordering the consecutive container jobs comprises taking printing deadlines of the container jobs into consideration.

13. A flatbed printer comprising:

a flat bed for placing a plurality of pieces of media to be printed upon, the flat bed having flat bed characteristics;

a printer controller equipped with a processor configured to receive print jobs to be printed on the plurality of pieces of media and control the printing of the received print jobs on the plurality of pieces of media, each of the print jobs having print job characteristics;

an armature constructed to move over the flat bed in at least one direction; and a print head configured to eject recording material on the plurality of pieces of media, the print head being attached to the armature, wherein the processor of the printer controller is programmable to include a funnel application, the flat bed characteristics being stored in the funnel application comprised in the printer controller, and the funnel application:

automatically groups the plurality of print jobs into a plurality of consecutive container jobs by retrieving the flat bed characteristics from the printer controller and gathering the group of print jobs for a container job, each of the plurality of container job comprising a group of print jobs for which media pieces are intended to be laid down on the flat bed for printing the group of print jobs on the media pieces in one print batch, and a digital plan of the flat bed, the digital plan comprising representations of the media pieces on which the group of print jobs in the container job are intended to be printed; and for each container job, automatically defines digital mask data with cutting information according to the digital plan for producing a mask sheet, wherein the flat bed is suitable for receiving the produced mask sheet and the media pieces on the flat bed positioned in accordance with the received mask sheet before the plurality of print jobs of the container job are unattended printed on the media pieces making use of the received mask sheet, and wherein the funnel application comprises a plurality of co-operating rules comprising a first set of rules for grouping the print jobs into the container jobs, the first set of rules being based on the values of the print job characteristics of the print jobs;

a second set of rules for determining a print order of the container jobs by the flat bed printer; and a third set of rules for grouping the print jobs into container jobs, the third set of rules based on the values of the retrieved flat bed characteristics, and wherein the plurality of print jobs of the container job are unattended printed during a production of a mask sheet for a consecutive container job.

14. The flatbed printer according to claim 13, wherein the funnel application comprises a predetermined priority scenario for the first, second and third set of rules together for cases wherein the results of application of the first set of rules, the second set of rules and the third set of rules conflict with each other.

15. The flatbed printer according to claim 14, wherein the predetermined priority scenario is implemented as a set of system settings of the flatbed printer.

* * * * *